United States Patent [19]

Carter

[11] Patent Number: 4,804,068

[45] Date of Patent: Feb. 14, 1989

[54] VEHICLE ELEVATING APPARATUS AND METHOD OF ASSEMBLY THEREOF

[75] Inventor: Edward V. Carter, Edwardsville, Ill.

[73] Assignee: Hunter Engineering Company, Bridgeton, Mo.

[21] Appl. No.: 63,069

[22] Filed: Jun. 17, 1987

[51] Int. Cl.[4] ............................................ B60S 13/00

[52] U.S. Cl. .................................... 187/8.72; 254/91; 248/608

[58] Field of Search .................... 187/8.41, 8.71, 8.72, 187/18; 254/122, 124, 10 C; 248/608; 74/607; 182/141, 148, 12

[56] References Cited

U.S. PATENT DOCUMENTS

| | | | |
|---|---|---|---|
| 1,818,060 | 8/1931 | Holman | 254/10 C |
| 2,201,147 | 5/1940 | Bary et al. | 187/8.72 |
| 2,201,189 | 5/1940 | Makaroff et al. | 254/91 |
| 2,208,983 | 7/1940 | Jackson et al. | 187/8.49 |
| 2,245,417 | 6/1941 | Schlarmann | 254/91 |
| 3,493,211 | 2/1970 | Barecki et al. | 248/608 |
| 3,669,399 | 6/1972 | Wager | 248/608 |
| 4,526,346 | 7/1985 | Galloway et al. | 254/122 |
| 4,574,614 | 3/1986 | Field | 187/8.72 |

*Primary Examiner*—Michael S. Huppert
*Assistant Examiner*—Kenneth Noland
*Attorney, Agent, or Firm*—Gravely, Lieder & Woodruff

[57] ABSTRACT

A vehicle elevating apparatus constructed with a pair of independent runway carrying parallelogram assemblies each being provided with raising and lowering motor of pressure fluid type, and a torsionally stiff component operatively connecting the parallelogram assemblies so that in the event of failure of one of the motors the torsionally stiff component will transfer the load and substantially equalize the position of the runways and prevent a catastrophic accident.

8 Claims, 3 Drawing Sheets

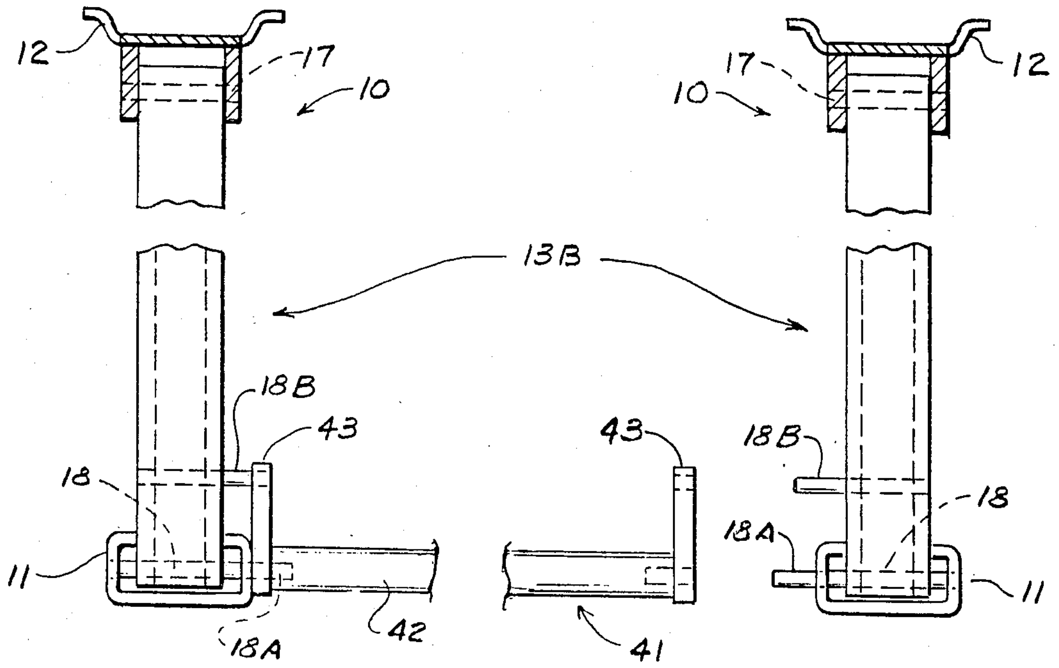
FIG. 2
FIG. 3
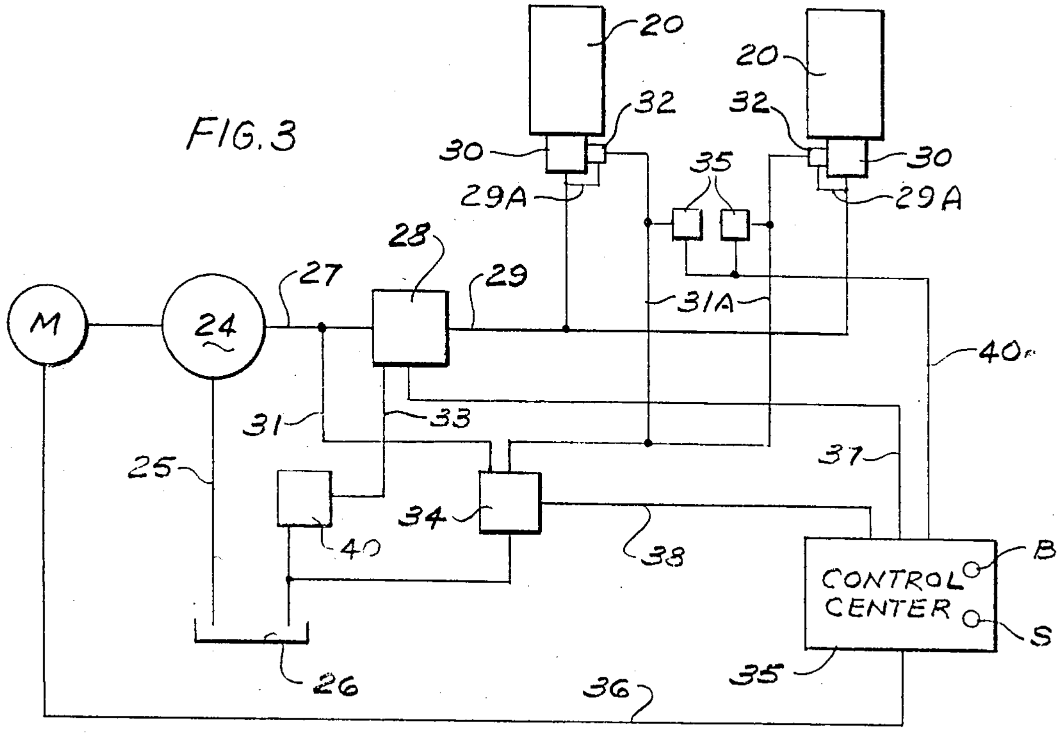

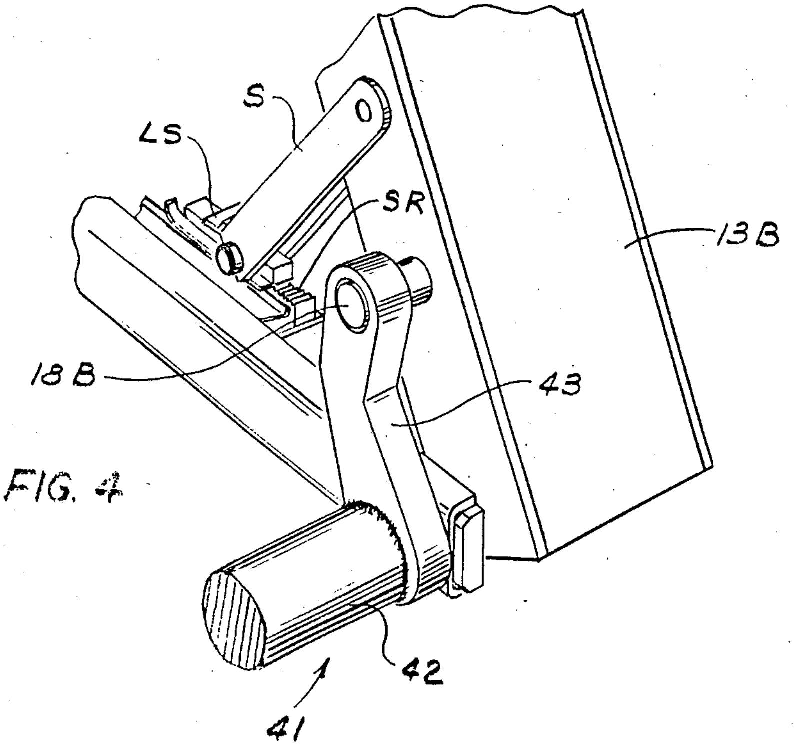
FIG. 4
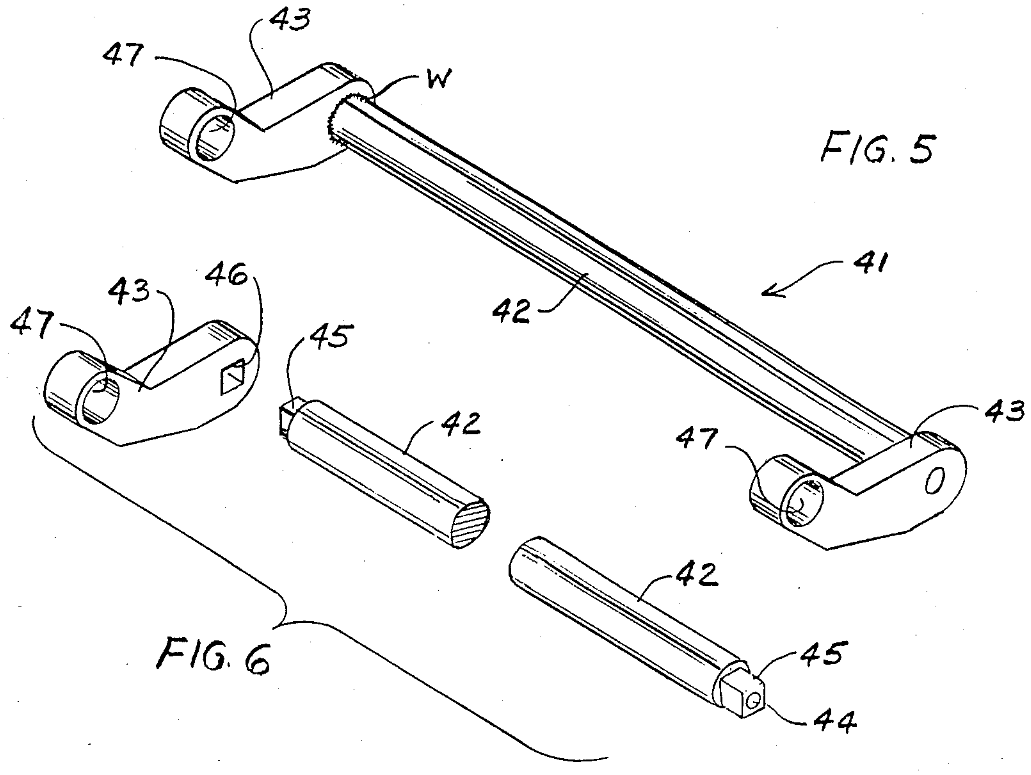
FIG. 5
FIG. 6

VEHICLE ELEVATING APPARATUS AND METHOD OF ASSEMBLY THEREOF

BACKGROUND OF THE INVENTION

1. Field of the Invention

This invention is concerned with improvement in the way vehicle elevating apparatus is constructed and assembled.

2. Description of the Prior Art

Elevating mechanism or vehicle service racks have been constructed for many years in a way that requires moving the separate pieces and parts to a job site and then going through the tedious process of fitting the parts together in a final assembly which must then be operated to determine if the parts fit as intended and perform the task of raising and lowering a vehicle, usually the heaviest vehicle permitted.

It is very important to be sure that the lifting motion of a pair of runways which support the right and left side wheels of a vehicle is coordinated to equalize that motion so the vehicle will remain substantially level. Usually, elevating apparatus is provided with a fluid pressure power source that effects the elevating and lowering motion, and some means is required so the fluid pressure applied to each runway will cause the runways to move up or down substantially the same amount so that no tipping of the vehicle can result. Fluid flow pressure systems require some means to establish equality of motion to the runways.

SUMMARY OF THE INVENTION

A principal object of the present invention is to provide a vehicle elevating apparatus in which preassembled components are easily brought into cooperation to complete an operative apparatus.

Another object of the present invention is to provide a vehicle elevating apparatus with a pair of vehicle wheel receiving runways supported from separate bases by spaced legs which together form a parallelogram, and to integrate the same with a torsionally stiff control device that operates to keep the wheel receiving runways substantially level and at the same height.

A preferred embodiment of the vehicle elevating apparatus comprises a pair of parallelogram assemblies with wheel supporting runways, motor means for raising and lowering the wheel supporting runways, and means to maintain the runways at substantially the same elevation for both directions of movement.

It is also a preferred embodiment of the present invention to provide components for vehicle elevating apparatus that will lend themselves to a method of fabrication in which the operating parts consist of preassembled components that may be brought together and joined to make up a complete operative apparatus, whereby the shipping of the components to a job site is greatly simplified so as to reduce shipping and handling expense.

Other objects of the present invention will appear as the details thereof are set forth and explained.

BRIEF DESCRIPTION OF THE DRAWINGS

A presently preferred embodiment of the vehicle elevating apparatus and the method of its assembly is disclosed in the drawing accompanying this specification, wherein:

FIG. 2 is a fragmentary end view of the pair of runway assemblies, as seen along line 2—2 in FIG. 1 with only so much of the structure shown that will illustrate the operating components and the method of assembly of those components;

FIG. 3 is a diagrammatic layout of a fluid pressure system associated with the pressure fluid motor means seen in FIG. 1 which elevates and lowers the runways;

FIG. 4 is a fragmentary view of a typical joining of the components making up an assembly with respect to the base and leg of one of the runway assemblies;

FIG. 5 is a perspective view of the torsion bar motion equalizing means seen in FIG. 2; and FIG. 6 is an exploded perspective view of a detail of the motion equalizing means of FIG. 5.

DETAILED DESCRIPTION OF THE EMBODIMENTS

Figure 1:
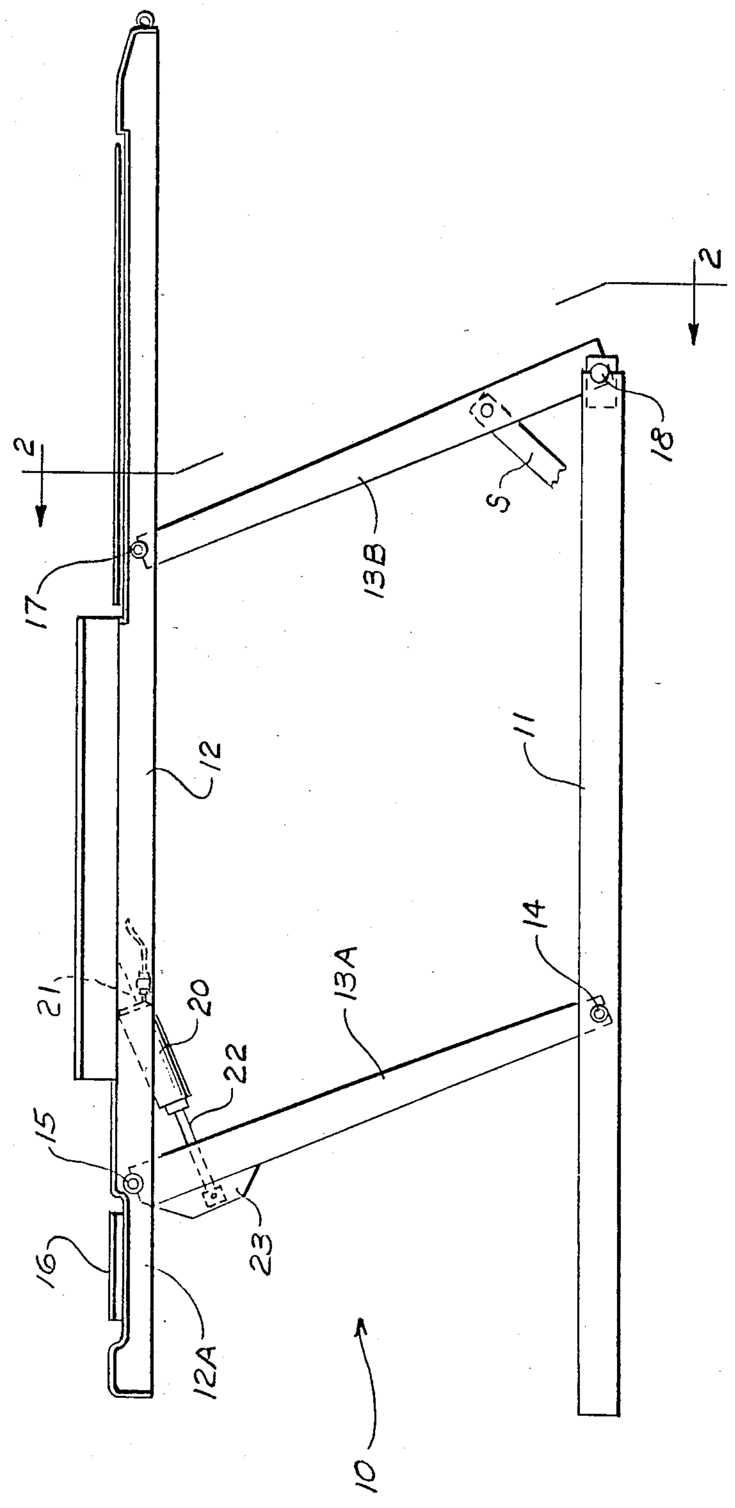
FIG. 1 is a schematic side elevation of one of a pair of substantially identical runway assemblies on which a vehicle may be elevated.

With reference to FIGS. 1 and 2 it can be seen that the vehicle elevating apparatus, or what may be called a service rack, comprises a pair of assemblies 10 that are intended to be brought into spaced side-by-side positions as in FIG. 2. Each assembly 10 consists of an upwardly facing channel shaped base 11, a vehicle wheel supporting runway 12, and a pair of spaced apart legs 13A and 13B. The legs 13B are shown in FIG. 2 for reasons that will appear presently. Each leg 13A is pivoted at pin 14 to the base channel 11 and is pivoted at pin 15 to the runway at the forepart 12A thereof where a vehicle front wheel support plate 16 is mounted. The rearmost leg 13B of each assembly 10 is pivotally connected by pin 17 to a rear portion of the runway 12, and the lower end of each leg 13B is pivotally connected by an elongated pin 18 which provides an extension 18A for a purpose to appear.

The view of FIG. 1 includes a pressure fluid motor means 20 supported by bracket 21 at the underside of the runway 12 in position to have its actuator rod 22 connected to a load carrying bracket 23 attached to the leg 13A. The source of pressure fluid, similar to the earlier application of Hunter, Ser. No. 831,262, filed Feb. 20, 1986 (now abandoned), has been modified as shown in FIG. 3 which includes a pump 24 driven by electric motor M. The pump 24 has a suction line 25 from the reservoir 26, and a delivery line 27 running to a solenoid operated direction control valve 28 which has its outlet line 29 connected to normally closed main valves 30 at the actuating motor means 20 which effects the elevation and lowering of the runways 12. A pressure fluid branch line 31 running to pilot control valve 34 is connected by similar branches 31A to pressurize normally closed pilot valves 32 which are intended to open the main valves 30 for lowering the runways 12. There is a fluid drain line 33 from valve 28 which runs through a velocity control valve 40, and then to reservoir 26.

A suitable control center is connected through depressing start buttons B and by electrical lead 36 to motor M for starting pump 24 to supply pressure fluid to line 27. At the same time the solenoid operated direction control valve 28 is spring activated in the raised direction open so pressure fluid can reach main valves 30 at the motor means 20. Currently, pressure fluid in lines 29A flows to the pilot valves 32 and cause main values 30 to open. When pilot valves 32 open the main valves 30, the motor means 20 are free to elevate the runways 12. However, should there be a loss of pressure in line 29 either by stoppage of the motor M or a break in the line 29, the main valves 30 will close and trap fluid thereby preventing collapse of the runways 12. The pressure fluid actuated motor means 35 will be unloaded and that will allow the shoes LS to engage the teeth in the safety rack SR, thereby locking the runway against dropping. In a normal situation when runways 12 need to be lowered the operator will push buttons S at the control center 35 and the circuits in the control center will cycle the pump 24 to supply pressure fluid to the direction control valve 28 so the motor means 20 will lift the runways 12 and take the weight of the lock shoes LS. The control system also actuates solenoid valve 34 by lead 38 so pressure fluid can actuate motor means 35 which raise and hold lock shoes LS (see FIG. 4) away from the safety rack SR so the strut S is free and the leg is also free to pivot and allow the runways 12 to rise and then descent. The circuit will only cycle this unloading of the shoes LS for a very short time and then by lead 37 actuate direction control valve 28 to begin the draining of the pressure fluid from motor means 20 through the velocity control valve 40 and back to the reservoir 26. The pump 24 is maintained operative to allow the central control circuit to signal the pilot valves 32 opening the main valves and to maintain pressure fluid on motor means 35 to hold the lock shoes LS free of the safety rack SR.

While the foregoing discloses the control system, the source of pressure fluid for operating the motor means to elevate the runways 12 is necessary to make an operating apparatus, the improvement residing in this invention is disclosed in connection with the means seen in FIGS. 2, 4, 5 and 6. Attention is now directed to those drawings where a runway motion equalizing subassembly component 41 is provided for the purpose of assuring that the elevating and lowering of the runways 12 is substantially equal or the same so that a vehicle will be supported in a level position.

That subassembly component 41 consists of an elongated torsionally stiff bar 42 having adjacent its opposite ends crank arms 43. The bar 42 is formed in its opposite ends with a socket 44, and the ends are also formed with shaped projections 45 which in the view of FIG. 6 are square or four sided, although six or eight sided projections may be employed. The purpose for shaped end projections 45 is to furnish a connection for a similarly shaped socket 46 in one end of the crank arms 43, the opposite end of each crank arm 43 is formed with a cylindrical socket 47. Each crank arm 43 is secured in position on the projections 45 by a circular line of welding W. The mechanical connection resulting between the shape end projection 45 of bar 42 and the similarly shaped socket 46 of crank arm 43 is such that any load imposed on the crank arm 43 is transmitted into the torsionally stiff bar member 42, whereby the crank arms are held in substantially the same angular positions. That is to say, if a load imposed on one crank arm 43 tends to displace it and twist the bar member 42 the opposite crank arm 43 will respond and undergo a substantially similar displacement.

As is seen in FIGS. 2 and 4, the bases 11 for each of the parallelogram side assemblies 10 connect the bottom ends of the legs 13B on special pivot shafts 18 which have the inwardly directed ends 18A projecting beyond the base 11. Also, the legs 13B are provided with pins 18B which project inwardly and are spaced from the pivot shafts 18. The shaft 18 and pins 18B are parallel and have a spacing equal to the center-to-center spacing of the centers of the sockets 44 and 47 for each crank arm. The angular relationship of the crank arms 43 to the axis of the torsion bar member 42 is critical so that one crank does not lead or lage the other crank. Thus, the crank arms 43 must be carefully angularly aligned so that the sockets 47 will be in alignment.

Having made the subassembly component 41 as detailed above, what remains is to follow the method of mounting one end of the component 41 (see FIG. 2) on the projection 18A and pin 18B, followed by moving the opposite side assembly 10 into position so its projection 18A and pin 18B will be received in the sockets 44 and 47. That method is assisted by having the legs 13B in the same positions, either lying down on the respective bases 11 or propped up at the same angle while moving the components into the final assembly. Thereafter any movement of either leg 13B will be transmitted through the component 41 to the opposite leg 13B in substantially an equal degree of movement. The final procedural steps are to use a check gauge to align the bases 11 in as precise a parallel alignment as possible. Then the bases 11 can be suitably anchored to the working surface as is well understood.

As is shown in FIG. 3 the two motor means 20 are in fluid coupled relation to the single pressure fluid pump 24 so that it can be expected that the resulting displacement of the motor means 20 will be greatest in the one that offers the least resistance, resulting in an imbalanced load applied to the runways 12. This problem is overcome by means of the component shown in FIGS. 2 and 5 which limits the independence of motion of one runway 12 and its parallelogram assembly relative to the opposite runway 12 and its parallelogram assembly. The torsion bar member 42 reacts to a small difference in the angular between the two crank arms 43 and transfers approximately half of the load imbalance to the lighter loaded runway 12 and its parallelogram assembly. This action of the torsion bar member 42 results in substantial equality of displacement for both motor means 20. In addition to the foregoing characteristics of the component 41, there is the safety aspect of having a device which can transfer the gross payload of one runway 12 to the opposite runway in the event of catastrophic failure of one of the motor means 20. This failure condition will result in a difference in the height of the runways 12 due to the torsional elasticity of the bar 42, but the runway 12 associated with the failed motor means 20 will remain supported. The construction of the component 41 and its ability to transfer loads between two independent runways 12 is unique due to its ability to safeguard vehicles that are placed on the elevating apparatus. It is unique also in the ability of the torsion bar member 42 to be disconnected from the parallelogram assemblies so the latter assemblies can be separately shipped to the place of installation.

The foregoing disclosure is not intended to unnecessarily limit the scope of the invention or its field of use.

What is claimed is:

1. A vehicle elevating apparatus comprising:

(a) a pair of assemblies each including a base, a runway on which a vehicle is lifted, and leg means pivotally interconnecting the runway with the base, the pair of assemblies being movable to assume cooperative side-by-side positions with the runways in parallel spaced apart positions to substantially match the vehicle wheel tread dimension;

(b) motor means operatively mounted in each of said pair of assemblies for effecting the elevation of said runway relative to said base by causing said leg means in each of said pair of assemblies to coordinate the elevating of said runway away from said base so that said runways remain substantially horizontal to level the vehicle as it is elevated; and (c) motion equalizing means interconnecting at least one leg means in each of said pair of assemblies, said motion equalizing means including an elongated and torsionally stiff member extending between said pair of assemblies and crank arm means secured adjacent the opposite ends of said torsionally stiff member and engaged with said at least one leg means in each of said pair of assemblies, said torsionally stiff member and crank arm means serving to maintain said runway in each of said pair of assemblies upon elevation at substantially the same distance from said bases.

2. The vehicle elevating apparatus set forth in claim 1 wherein said pair of assemblies each forms a parallelogram with said runways movable relative to said bases upon pivoting movement of said leg means relative to said bases, and said motion equalizing means is detachable from both of said pair of assemblies.

3. The vehicle elevating apparatus set forth in claim 1 wherein said interconnection between said torsionally stiff member and crank arms with said pair of assemblies comprises pin and socket slip fits.

4. The vehicle elevating apparatus set forth in claim 1 wherein said motor means interconnects said runways adjacent one end of said runways and the adjacent leg means, and said motion equalizing means is operatively connected with said bases and the adjacent leg means.

5. A vehicle elevating apparatus comprising:

(a) a pair of initially separate vehicle supporting assemblies, each consisting of its own base, vehicle wheel supporting runway, and a pair of leg means spaced along and pivotally interconnecting the base and runway to form a parallelogram figure, said pair of assemblies forming the vehicle elevating means in the apparatus;

(b) power operating means for each of said pair of assemblies connected between a first one of said legs and one each of said base of runway for effecting elevation of said runways relative to said bases;

(c) motion equalizing means detachable from and operatively interconnecting each of said bases and a second one of said legs for keeping substantial equality in the elevating movement of said runways; and (d) a power supply connected to said power operated means for effecting the elevating of said runways, said motion equalizing means following the runway elevating motion for resisting differences in the motion between said pair of assemblies.

6. The vehicle elevating apparatus set forth in claim 5 wherein said pair of assemblies are separable from each other and from said motion equalizing means and said power supply for shipping convenience.

7. The vehicle elevating apparatus set forth in claim 5 wherein said operative interconnection between said motion equalizing means and each of said bases and the second one of said legs consists of pin and socket means.

8. A vehicle elevating apparatus comprising:

(a) a pair of assemblies, each consisting of its own base, vehicle supporting runway, and a pair of leg means spaced along and pivotally interconnecting the base and runway to form a parallelogram figure;

(b) power operating means for each of said pair of assemblies connected between a first one of said legs and one each of said base or runway for effecting elevation of said runways relative to said bases;

(c) motion equalizing means detachable from and operatively interconnecting each of said bases and a second one of said legs for keeping substantial equality in the elevating movement of said runways said motion equalizing means consists of an elongated and torsionally stiff member and crank arms secured adjacent the opposite ends of said stiff member, said opposite ends of said stiff member having axially formed sockets, said crank arms having ends formed with sockets adjacent said ends, and pin means engages between said sockets and said second one of said legs and the adjacent bases for establishing the engagement therebetween; and (d) a power supply connected to said power operated means for effecting the elevating of said runways.

* * * * *